United States Patent
Wang et al.

(10) Patent No.: US 7,554,076 B2
(45) Date of Patent: Jun. 30, 2009

(54) SENSOR SYSTEM WITH MODULAR OPTICAL TRANSCEIVERS

(75) Inventors: Yaujen Wang, Arcadia, CA (US); Brendan J. D. Irwin, Glendora, CA (US); Raj K. Shori, Burbank, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 364 days.

(21) Appl. No.: 11/471,926

(22) Filed: Jun. 21, 2006

(65) Prior Publication Data

US 2007/0295891 A1    Dec. 27, 2007

(51) Int. Cl.
*G01S 7/486* (2006.01)
(52) U.S. Cl. .................. 250/221; 250/551; 244/3.15; 244/3.16
(58) Field of Classification Search .......... 250/221, 250/551; 244/3.15, 3.16
See application file for complete search history.

(56) References Cited

U.S. PATENT DOCUMENTS

| | | | |
|---|---|---|---|
| 4,027,651 A * | 6/1977 | Robbins, Jr. ................. 126/601 |
| 4,576,346 A * | 3/1986 | Gauggel et al. ............. 244/3.16 |
| 4,630,050 A | 12/1986 | Johnson | |
| 5,964,432 A | 10/1999 | Obkircher | |
| 6,180,945 B1 * | 1/2001 | Barton et al. ............. 250/370.1 |
| 6,268,822 B1 * | 7/2001 | Sanders et al. ................. 342/54 |
| 6,279,478 B1 | 8/2001 | Ringer et al. | |
| 6,817,296 B2 | 11/2004 | Ringer et al. | |
| 6,901,864 B2 | 6/2005 | Helander | |
| 6,920,827 B2 | 7/2005 | Lloyd | |
| 6,943,873 B2 * | 9/2005 | Sallee ...................... 356/141.1 |
| 2006/0033935 A1 * | 2/2006 | Keightley et al. ........... 356/638 |

* cited by examiner

*Primary Examiner*—Georgia Y Epps
*Assistant Examiner*—Tony Ko
(74) *Attorney, Agent, or Firm*—Tarolli, Sundheim, Covell & Tummino LLP

(57) ABSTRACT

An optical sensor system and method includes a plurality of optical transceiver modules arranged across the surface of the optical sensor in a predetermined pattern. A given optical transceiver module includes an optical transmitter that produces at least one light beam and an optical receiver that detects reflected light from the at least one light beam. The optical transceiver module further includes housing for housing the optical transmitter and the optical receiver.

20 Claims, 4 Drawing Sheets

US 7,554,076 B2

SENSOR SYSTEM WITH MODULAR OPTICAL TRANSCEIVERS

TECHNICAL FIELD

The present invention relates to sensor systems and, more particularly, to a sensor system with modular optical transceivers.

BACKGROUND OF THE INVENTION

During the last fifty years, missile and target speeds have increased to a great extent, requiring detection and guidance systems associated with automated target recognition systems to be pushed forward. This can result in larger time delays and larger detection errors due to incomplete or inaccurate encounter information. Accordingly, it has been necessary to increase warhead beamwidths to fill the larger volumes of uncertainty with a consequent reduction in effectiveness. Optical fuzing sensors have been proposed to overcome these deficiencies. Unfortunately, these optical sensors require complex and difficult alignments, leading to significant expense, and are vulnerable to error due to misalignment of the optical components comprising the sensor.

FIG. 1 illustrates a prior art fuzing sensor 10. The illustrated sensor 10 can be mounted on a moving object, such as a missile, and utilized to detect objects in or around a path of motion associated with the moving object. The fuzing sensor 10 includes a plurality of transmitters (not shown) in an outer ring 12 of the sensor. Each transmitter projects respective first and second beams of light forward of the sensor. In the illustrated sensor, the transmitters are aligned such that the first set of light beams provided from the plurality of transmitters are projected at a common first angle to a surface of the outer ring 12, such that when the fuzing sensor 10 is rotated about a central axis, the first set of light beams combine to trace a first cone 14 in the space forward of the sensor. Similarly, the second set of light beams provided from the plurality of transmitters are projected at a common second angle to a surface of the outer ring 12, such that when the fuzing sensor 10 is rotated, the second set of light beams combine to trace a second cone 16 in the space forward of the sensor.

When an object intersects one or both of the cones 14 and 16, light from the light beams is reflected back toward the sensor. This light can be detected at a central receiver 22 to determine the presence of objects within the scanning range of the sensor. The central receiver 22 contains a plurality of detectors (not shown) in a focal plane 24 at the rear of the sensor 10. Each detector is aligned to view a region in space along the cones 14 and 16 defined by the transmitters. This is facilitated by a common receiver optic 26 containing one or more lenses to collect reflected light and direct it to the focal plane 24 for detection at the detectors.

It will be appreciated that precise alignment of all elements of the sensor module 10 is necessary to ensure proper detection of detected light at the focal plane. A typical module 10 can include sixteen transmitters, each producing two beams, one associated with each cone 14 and 16, and thirty-two detectors, each configured to detect reflecting light associated with one of the beams. Each of the transmitters and detectors must be co-aligned precisely along a common optical axis of the sensor module 10. If any of these forty-eight elements are faulty or misaligned, the entire module 10 must be reworked. Further, it will be appreciated that the individual transmitters must contain fairly complex optics to deflect a generated beam to a region easily detectable from the central receiver 22. Accordingly, the transmitters can be unnecessarily expensive and subject to internal misalignment.

SUMMARY OF THE INVENTION

In accordance with one aspect of the present invention, an optical sensor system for detecting a moving object is provided. A first optical transceiver module includes a first optical transmitter that produces at least one beam of light and a first optical receiver that is operative to detect reflected light from the first optical transmitter. The first optical transceiver module further includes a first housing for housing the first optical transmitter and the first optical receiver. A second optical transceiver module includes a second optical transmitter that produces at least one beam of light and a second optical receiver that is operative to detect reflected light from the second optical transmitter. The second optical transceiver module further includes a second housing for housing the second optical transmitter and the second optical receiver.

In accordance with another aspect of the present invention, an optical sensor apparatus is provided. A plurality of optical transceiver modules are arranged across the surface of the optical sensor in a predetermined pattern. A given optical transceiver module includes an optical transmitter that produces at least one light beam and an optical receiver that detects reflected light from the at least one light beam. The optical transceiver module further includes a housing for housing the optical transmitter and the optical receiver.

In accordance with yet a further aspect of the present invention, a method for constructing an optical sensor is provided. A plurality of optical transceiver modules are produced. The plurality of optical transceiver modules are individually and internally aligned such that one or more detectors associated with each transceiver are operative to detect light from a region in space illuminated by the transceiver. The plurality of optical transceiver modules are combined to produce the optical sensor.

DETAILED DESCRIPTION OF INVENTION

In accordance with an aspect of the present invention, an optical sensor system can be constructed as a plurality of optical transceiver modules. Each optical transceiver module is self-contained, having both an optical transmitter that emits at least one light beam and one or more detectors aligned as to detect reflected light from the at least one light beam. Each module can be separately aligned, such that misaligned modules can be discarded without the need to discard other transceiver elements of the sensor system. To preserve the intermodule alignment on the sensor, each module can be configured as to be demountably affixed or attached to a carrier, which can be joined together with other carriers to provide an appropriately aligned sensor module. Alternatively, the modules can affix to a frame having appropriate attachment points for receiving the modules. It will be appreciated that this modular approach greatly reduces the complexity of aligning an optical sensor module.

Figure 2:
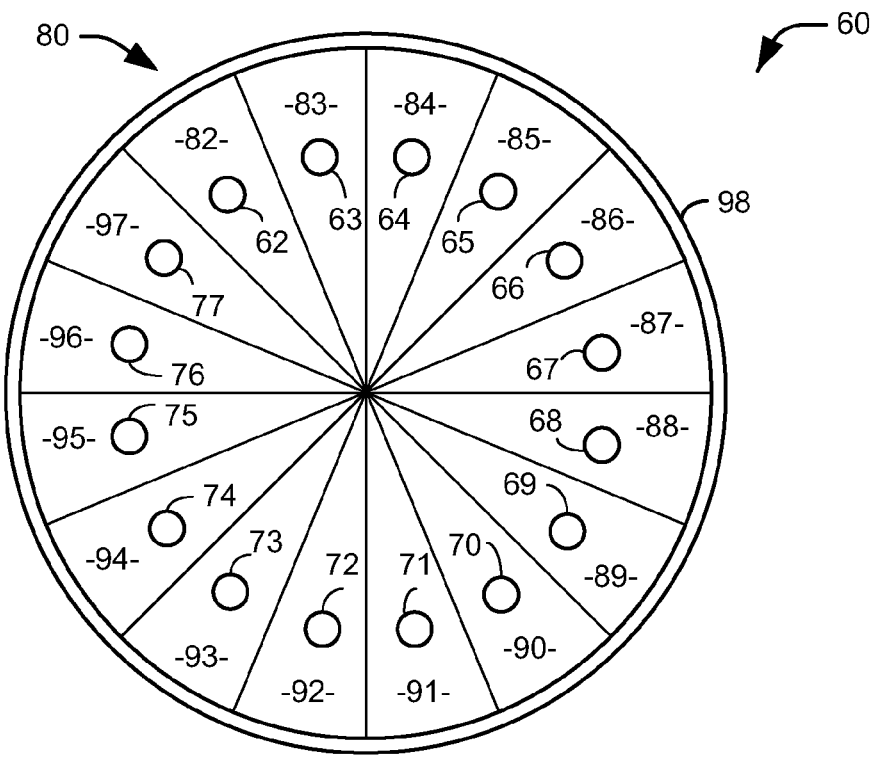
FIG. 2 illustrates an exemplary implementation of an optical sensor in accordance with an aspect of the present invention.

FIG. 2 illustrates an optical sensor system 60 in accordance with an aspect of the present invention. In accordance with an aspect of the present invention, the illustrated optical sensor system 60 can be mounted at the head of a moving object, such as a missile warhead, to detect objects in or near the path of the object. It will be appreciated, however, that the sensor system 60 can be utilized for other purposes, such as terrain mapping. The illustrated sensor system 60 comprises a plurality of optical transceiver modules 62-77 arranged in a circle. Each of the optical transceiver modules 62-77 is operative to determine the presence of an object within at least one associated region ahead of the moving object. For example, each transceiver module can include a transmitter that produces one or more laser beams to illuminate respective regions of space in front of the moving object. When an object intersects an illuminated region of space, one or more detectors within the module can detect light reflected from the object to determine that an object is present in the illuminated region.

Figure 1:
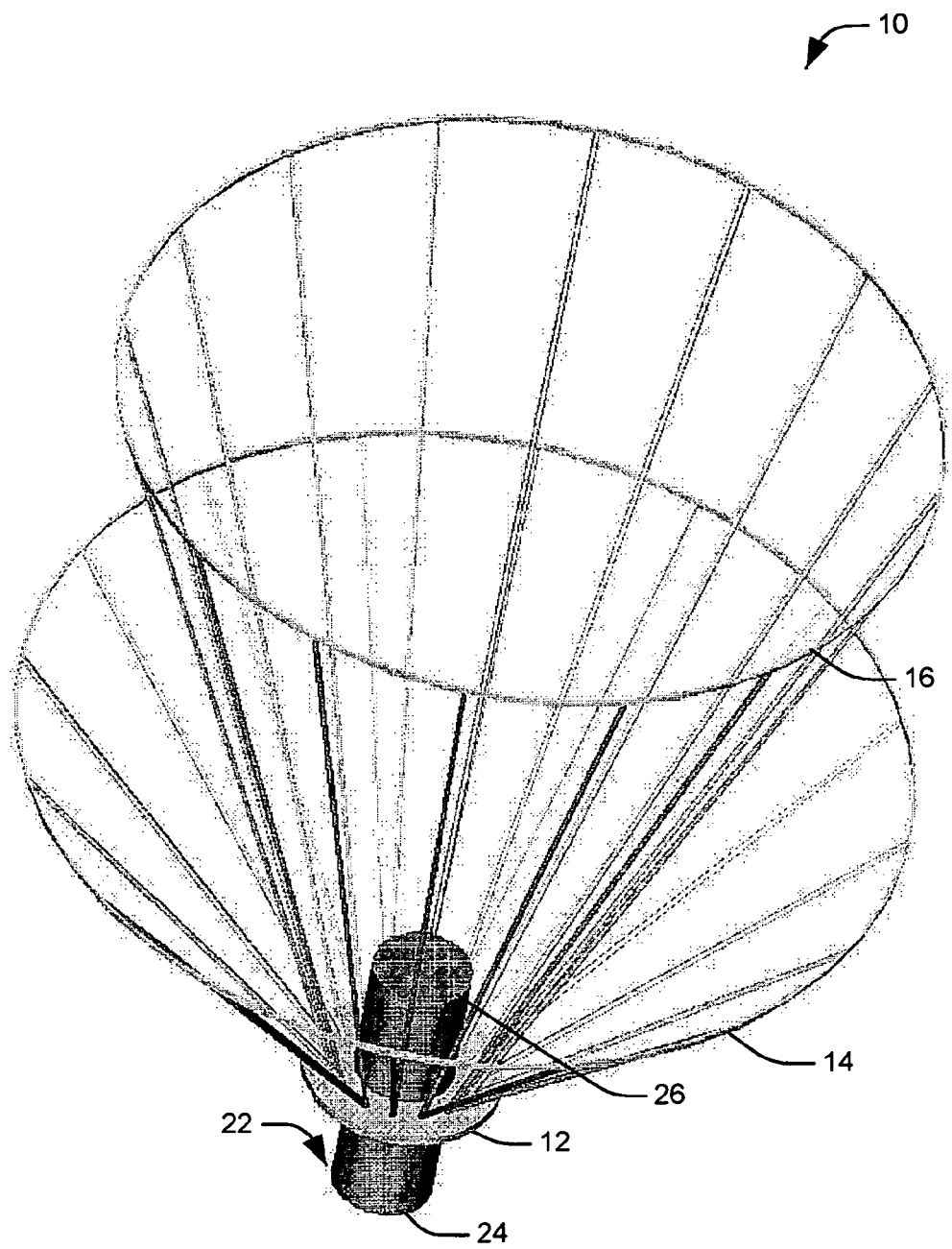
FIG. 1 illustrates a prior art fuzing sensor.

In accordance with an aspect of the present invention, the moving object can rotate at a known rate along an axis normal to a surface 80 of the fusing sensor 60, such that the one or more regions of space illuminated by a given module will rotate at a known rate. Accordingly, for each beam produced by a given optical transceiver module 62-77, a cone will be traced in space, similar to those illustrated in FIG. 1. The modules can be aligned such that respective first beams associated with each optical transceiver module trace substantially the same cone in space, such that the output of respective first detectors within the plurality of optical transceiver modules 62-77 can indicate an object intersecting the cone.

In one implementation, each of the transceiver modules can produce two beams, for example, via a beam splitting device. The modules can be aligned such that respective second beams from the transceiver modules 62-77 trace a common second cone having a different opening angle than the first cone. Respective second detectors within the cones can detect the presence of an object that intersects the cones. It will be appreciated that the use of multiple modules to define each cone, and the use of multiple cones allows for verification of the presence of an object according to its motion within and across the cones. Various verification algorithms can utilize the detector outputs for this purpose.

It will be appreciated that alignment problems associated with prior art sensor systems can be substantially mitigated through the use of the optical transceiver modules 62-77. For example, the transceiver modules 62-77 can be mounted on or constricted within appropriately shaped carriers 82-97, such as the wedge-shaped carriers illustrated in FIG. 2, for insertion into the sensor 60. A frame 98 associated with the sensor 60 can be configured to mechanically retain the plurality of carriers 82-97 in manner that maintains the various transceiver modules in an appropriate alignment with one another. For example, each carrier 82-97 can snap onto the frame 98 associated with the sensor 60. Alternatively, the carriers 82-97 can be configured to mechanically couple with one another. These carriers can be utilized to assure alignment among the various transceiver modules, limiting the alignment issue to the internal alignment of the module. It will be appreciated that the carriers can be demountably attached to the frame 98, such that when a misalignment occurs, the carrier containing the faulty module can be independently discarded. Although the frame 98 is shown as having an area larger than the collective area of the modules, one skilled in the art will apprieciate that the frame 98 can take any size or shape capable of retaining the modules.

It will be appreciated that the illustrated wedge shape is merely exemplary, and that other appropriate shapes for the carriers can be utilized in accordance with an aspect of the present invention. Further, in an alternate implementation, the transceiver optics associated with the modules 62-77 can be inserted directly into associated carriers 82-97, such that the carriers serve as a housing for the optics within the modules.

In accordance with an aspect of the present invention, each of the individual transmitters within the plurality of optical transceiver carriers 62-77 can be modulated as to pulse at a specific frequency. The detectors associated with each of the plurality of transceivers can be configured to detect only light modulated at the specific frequency associated with their respective transceiver. Accordingly, false detections due to external light sources can be reduced.

Figure 3:
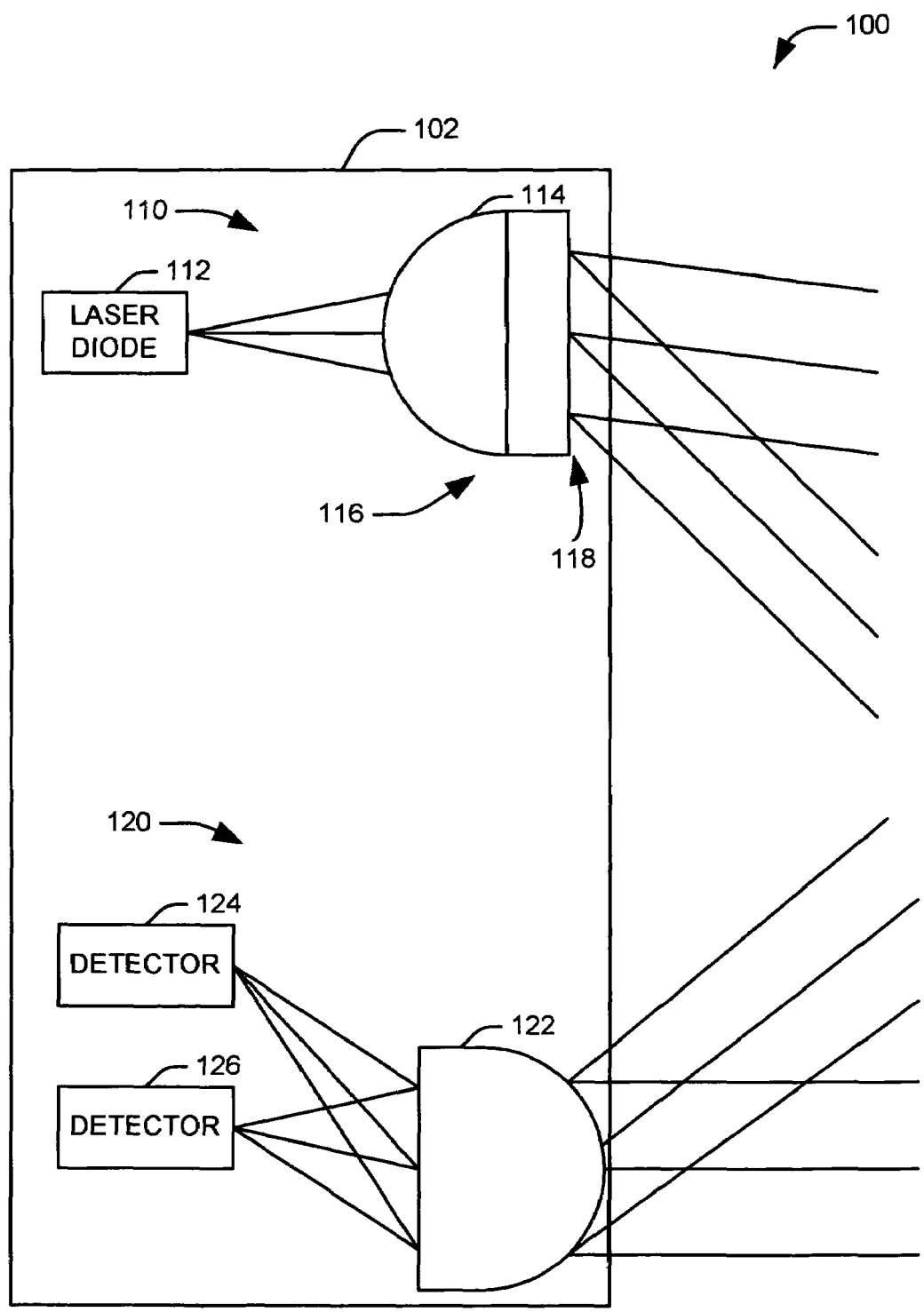
FIG. 3 illustrates an exemplary optical transceiver module in accordance with an aspect of the present invention.

FIG. 3 illustrates an exemplary optical transceiver module 100 in accordance with an aspect of the present invention. The module includes at least one housing 102 that contains optical components associated with the optical transceiver module 100. A given housing 102 includes a set of transmitting optics 110 and a set of receiving optics 120. The transmitting optics include a laser diode 112 that produces a coherent beam of light. In accordance with an aspect of the present invention, the light provided by the diode can be modulated to a characteristic frequency associated with the optical sensor module, such that the coherent beam of light is provided as a series of pulses generated at the characteristic frequency. The laser diode output passes through an aspherical lens 114 that collimates the light beam from the laser diode 112. In the illustrated embodiment, a first surface 116 of the aspherical lens 114 is curved to provide the collimating effect of the lens. A second surface 118 of the aspherical lens is substantially flat. The second surface 118 of the lens includes a diffractive grating that diffracts the collimated light beam into first and second transmitted light beams that illuminate respective first and second regions in space.

Light reflected from the illuminated regions is received at a collecting lens 122. The collecting lens 122 can be coated with an appropriate filtering material such that light outside of a band associated with the characteristic frequency of the optical module does not pass through the lens 122. Accordingly, light originating from sources other than the laser diode 112 will be attenuated at the lens 122. The collecting lens 122 collects the reflected light and provides it to first and second detectors 124 and 126. The collecting lens 122 and the detectors 124 and 126 can be aligned such that the first detector 124 receives light from the region illuminated by the first transmitted light beam, and the second detector 126 receives light from the region illuminated by the second transmitted light beam.

It will be appreciated that the design of the transceiver module 100 requires only a single aspherical lens 114 with diffractive grating 118 to produce the two beams. This represents a significant simplification of the design of the transmitters of FIG. 1. This can be explained, at least in part, by the spatial proximity of the transmitting portion of the module 100 to the detectors 124 and 126. Since it is no longer necessary to bend the transmitted beams to a region visible to a central receiver, the complexity, and accompanying expense, of the transmitter is reduced. Further, it will be appreciated that a plurality of modules similar to the illustrated module 100 represents a more robust implementation than the central receiver 22 of FIG. 1, as each module contains its own separate set of receiver optics 120. Thus even if one module is damaged or misaligned, the remaining modules are still operational. In the prior art system illustrated in FIG. 1, any significant damage to, or misalignment of, the common receive optic 26 renders all of the detectors useless.

Figure 4:
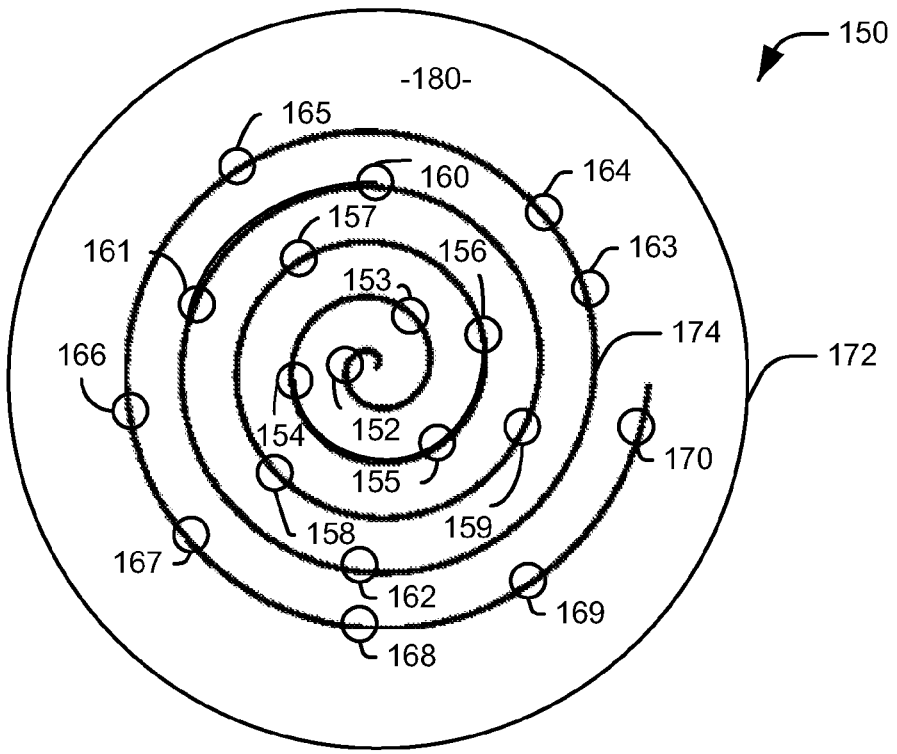
FIG. 4 illustrates an alternative implementation of an optical sensor in accordance with an aspect of the present invention.

FIG. 4 illustrates an alternative implementation of an optical sensor 150 in accordance with an aspect of the present invention. In accordance with an aspect of the present invention, the illustrated optical sensor 150 can be mounted at the head of a moving object, such as a missile warhead, to detect objects in or near the path of the object. The illustrated sensor 150 comprises a plurality of optical transceiver modules 152-170 arranged in or on a frame 172 along a spiral alignment path 174. It will be appreciated that the frame 172 and the alignment path 174 can vary in shape according to the implementation. The frame 172 can be configured to contain a plurality of alignment points that are operative to receive the plurality of optical transceiver modules 152-170, such that the plurality of optical transceiver modules can be demountably attached to the frame. Each of the optical transceiver modules 152-170 is operative to determine the presence of an object within at least one associated region ahead of the moving object. For example, each transmitter can produce one or more laser beams that illuminate respective regions of space in front of the moving object. When an object intersects an illuminated region of space, one or more detectors within the module can detect light reflected from the object to determine that an object is present in the illuminated region.

In accordance with an aspect of the present invention, the moving object can rotate at a known rate along an axis normal to a surface 180 of the sensor 150, such that the one or more regions of space illuminated by a given module will rotate at a known rate. Accordingly, for each beam produced by a given optical transceiver module 152-170, a cone will be traced in space. Since the modular nature of the optical transceiver modules 152-170 obviate the necessity of aligning the transceivers to a central receiver, the modules can be aligned such that each beam associated with a given optical transceiver module can trace a different detection cone in space, such that the plurality of optical transceiver modules 152-170 can trace individual detection cones in space. By aligning the modules precisely, it is possible to tile the detection cones over a monitored region to provide finer detection of objects within the monitored region.

Figure 5:
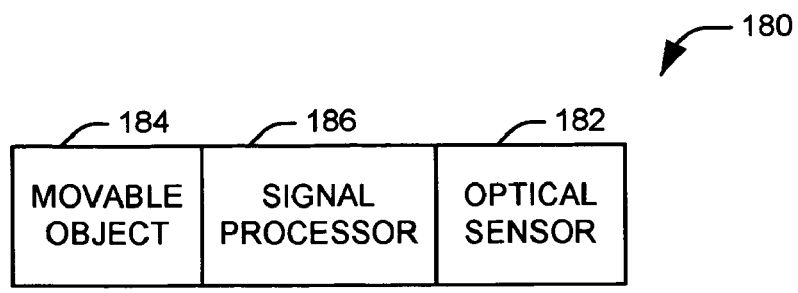
FIG. 5 illustrates a mobile system incorporating an optical sensor system in accordance with an aspect of the present invention

FIG. 5 illustrates a mobile system 180 incorporating an optical sensor system 182 in accordance with an aspect of the present invention. The mobile system 180 includes a movable object 184 that can be moved along a desired path of motion via an appropriate means. It will be appreciated that the system 180 can be utilized in any of a number of environments, such that movable objects suitable for use with the present invention can include spacecraft, watercraft, airborne objects, and ground vehicles. In one implementation, the movable object 184 is a missile, and the mobile system is a fuzing system for the missile.

The optical sensor system 182 is operative to detect objects in or near the path of motion of the movable object 184. When an object is detected by the sensor system 182, a signal processor 186 associated with the optical sensor is operative to interpret the data received at the sensor system, and detect the presence of objects within or around the path of motion associated with the movable object 184. It will be appreciated that various functions associated with the movable object 184 can operate according to input from the signal processor 186. For example, when the movable object 184 is a missile, the signal processor 186 may be operative to direct a warhead associated with the missile to detonate when the missile is proximate to the detected airborne object.

Figure 6:
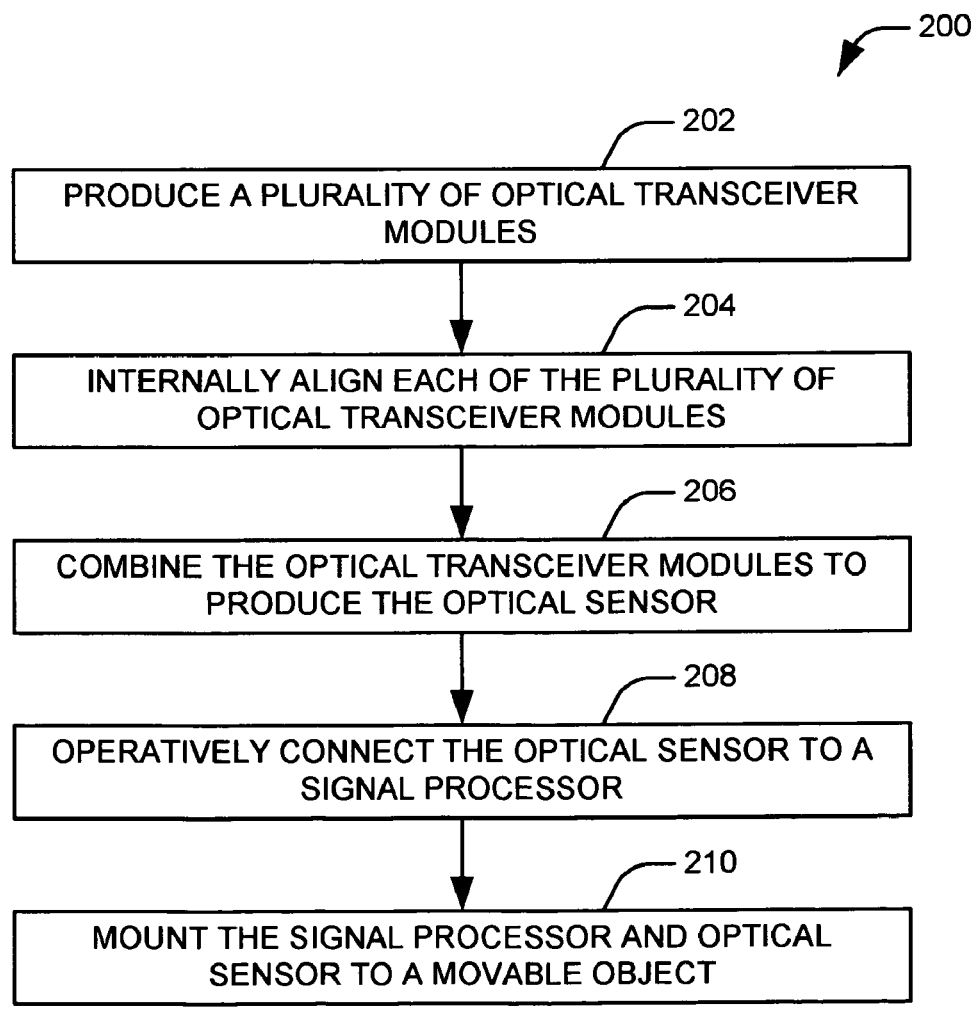
FIG. 6 illustrates a methodology for constructing an optical sensor in accordance with an aspect of the present invention.

In view of the foregoing structural and functional features described above, methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates a methodology 200 for constructing an optical sensor in accordance with an aspect of the present invention. At 202, a plurality of optical transceiver modules are produced. It will be appreciated that the optical modules can be produced either on or within respective carriers, such that the modules can be mechanically coupled to one another or an associated frame of the sensor without damaging the transceiver module. At 204, the optical transceiver modules are internally aligned, such that one or more detectors associated with each transceiver are operative to detect light from a region in space illuminated by the transceiver. At 206, the optical transceiver modules are combined to form the optical sensor. It will be appreciated that by utilizing individual modules that mechanically couple to one another or to a sensor frame, alignment issues among the plurality of optical transceivers can be substantially eliminated. Accordingly, a functional sensor system can be quickly assembled from a plurality of optical transceiver modules that can be individually produced, aligned, and verified prior to introduction to the sensor.

At 208, the sensor system is operatively connected to a signal processor. The signal processor can be configured to accept the sensor output and make determinations on the proximity and location of objects within the range of the sensor. At 210, the optical sensor system and the signal processor are mounted on and operatively connected to a movable object. The signal processor can be connected to a control portion of the movable object such that one or more functions of the movable object can be controlled by the signal processor according to the output of the optical sensor system. Accordingly, the movable object can respond appropriately to the presence of objects near or within its path of motion.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. An optical sensor system for detecting a moving object, comprising:
 a first optical transceiver module, comprising:
  a first optical transmitter that produces at least one beam of light, the first optical transmitter further comprises a first aspherical lens that collimates a beam of light from a first laser diode and a first diffractive grating that splits the collimated beam of light from the first aspherical lens into a first plurality of beams of light;

a first optical receiver that is operative to detect reflected light from the first optical transmitter, the first optical receiver comprises a first collector lens that directs reflected light associated with the first plurality of beams to respective detectors of a first set of detectors;

a first housing for housing the first optical transmitter and the first optical receiver; and a second optical transceiver module, comprising:

a second optical transmitter that produces at least one beam of light, the second optical transmitter further comprises a second aspherical lens that collimates a beam of light from a second laser diode and a second diffractive grating that splits the collimated beam of light from the second aspherical lens into a second plurality of beams of light;

a second optical receiver that is operative to detect reflected light from the second optical transmitter, the second optical receiver comprises a second collector lens that directs reflected light associated with the second plurality of beams to respective detectors of a second set of detectors; and a second housing for housing the second optical transmitter and the second optical receiver.

2. The system of claim 1, wherein the first and second optical transceiver modules are demountably attached to one of a frame and to each other via respective carriers that mechanically retain a given optical transceiver module.

3. The system of claim 2, wherein the respective carriers comprise a first wedge-shaped carrier and a second wedge-shaped carrier each having a respective apex located substantially at a center of the optical sensor system and being, mechanically coupled, such that the first optical transceiver module and the second optical transceiver module are properly aligned relative to one another.

4. The system of claim 3, further comprising a plurality of additional optical transceiver modules retained in respect wedge-shaped carrier mechanically coupled to one another and the first and second wedge-shaped carriers to form a continuous circular arrangement of wedge shape carriers.

5. The system of claim 1, wherein the first optical transceiver and the second optical transceiver are internally aligned to align respective light beams with respective detectors prior to being demountably attached.

6. The system of claim 1, wherein the beams of light produced by the first laser diode and the second laser diode are modulated to comprise a series of pulses at a frequency associated with the system.

7. The system of claim 6, wherein the first set of detectors and the second set of detectors are configured to recognize light modulated at the frequency associated with the system.

8. The system of claim 1, wherein the first optical transmitter is aligned to produce a first light beam at a first angle relative to a surface of the sensor system and a second light beam at a second angle relative to the surface of the sensor system, and the second optical transmitter is aligned to produce a third light beam at the first angle relative to the surface of the sensor system and a fourth light beam at the second angle relative to the surface of the sensor system such that a rotation of the optical sensor causes the first and third light beams to produce a first light detection cone and the second and fourth light beam to produce a second light detection cone.

9. The system of claim 8, wherein the first housing is a first wedge-shaped carrier and the second housing is a second wedge-shaped carrier each having a respective apex located substantially at a center of the optical sensor system and the first carrier and the second carrier are demountably attached to one of a frame or each other.

10. A fuzing system comprising the optical sensor system of claim 1.

11. A detection system having an optical sensor apparatus, the optical sensor apparatus comprising:

a plurality of optical transceiver modules arranged in a predetermined pattern, a given optical transceiver module comprising:

an optical transmitter that produces at least one light beam;

an optical receiver that detects reflected light from the at least one light beam; and a housing for housing the optical transmitter and the optical receiver, the predetermined pattern being arranged such that a rotation of the optical sensor causes the light beams produced by the respective optical transmitters of the plurality of optical transceivers to produce a plurality of light detection cones.

12. The system of claim 11, the optical sensor being mounted to an object configured to rotate during an associated path of motion, the plurality of optical transceivers being arranged such that a rotation of the optical sensor causes the light beams produced by the respective optical transmitters of the plurality of optical transceivers to produce a plurality of light detection cones in the space preceding the moving object along the path of motion.

13. The system of claim 11, the predetermined pattern comprising one of a spiral pattern and a circular pattern.

14. The system of claim 11, a given optical transmitter comprising:

a laser diode that produces a beam of light;

an aspherical lens that collimates the beam of light; and a diffractive grating that splits the beam of light into a plurality of beams of light.

15. The system of claim 11, wherein a first housing, associated with a first of the plurality of optical transceiver modules, is a first wedge-shaped carrier and a second housing, associated with a second of the plurality of optical transceiver modules, is a second wedge-shaped carrier, and the first wedge-shaped carrier and the second wedge-shaped carrier each having a respective apex located substantially at a center of the optical sensor system and are demountably attached to one of a frame or each other.

16. The system of claim 11, wherein the plurality of optical transceiver modules are demountably attached to one of a frame and to each other via respective carriers that mechanically retain a given optical transceiver module.

17. The system of claim 11, wherein the plurality of transmitters associated with the plurality of transceiver modules are modulated such that each of the plurality of optical transmitters produces pulses of light at an associated frequency, and the at least one receiver associated with the plurality of transceiver modules are configured to detect light modulated at the associated frequency of its associated optical transmitter.

18. A method for constructing an optical sensor comprising:

producing a plurality of optical transceiver modules;

internally aligning each of the plurality of optical transceiver modules, such that one or more detectors associated with each transceiver are operative to detect reflected light beams from detected targets associated with transmitted light beams of the transceiver; and combining and arranging the plurality of optical transceiver modules to produce the optical sensor, such that a rotation of the optical sensor causes the light beams produced by the respective optical transceivers to produce a plurality of light detection cones for detecting targets.

19. The method of claim 18, wherein each of the optical transceiver modules is housed in a carrier apparatus, and combining the plurality of optical transceiver modules comprises mechanically coupling the associated carrier apparatuses to one of a frame and one another.

20. The method of claim 18, wherein the optical transceiver modules are arranged in a spiral pattern.

\* \* \* \* \*